US010888852B2

(12) United States Patent
Ludvig et al.

(10) Patent No.: US 10,888,852 B2
(45) Date of Patent: Jan. 12, 2021

(54) FCC CATALYST ADDITIVE AND BINDER

(71) Applicant: ALBEMARLE CORPORATION, Baton Rouge, LA (US)

(72) Inventors: Maria Margaret Ludvig, El Iago, TX (US); Sandra Gavalda, Manvel, TX (US); Nataly Garcia Vargas, Pearland, TX (US); Petrus Martinus Overwater, Aalsmeer (NL); Kevin Alfonso Miller, League City, TX (US); Edward Lee Foster, Pearland, TX (US)

(73) Assignee: ALBEMARLE CORPORATION, Charlotte, NC (US)

( * ) Notice: Subject to any disclaimer, the term of this patent is extended or adjusted under 35 U.S.C. 154(b) by 0 days.

(21) Appl. No.: 15/747,051

(22) PCT Filed: Jul. 22, 2016

(86) PCT No.: PCT/US2016/043659
§ 371 (c)(1),
(2) Date: Jan. 23, 2018

(87) PCT Pub. No.: WO2017/015597
PCT Pub. Date: Jan. 26, 2017

(65) Prior Publication Data
US 2018/0361367 A1 Dec. 20, 2018

Related U.S. Application Data

(60) Provisional application No. 62/195,949, filed on Jul. 23, 2015.

(51) Int. Cl.
| B01J 29/84 | (2006.01) |
| B01J 29/00 | (2006.01) |
| B01J 29/83 | (2006.01) |
| C10G 11/05 | (2006.01) |
| C10G 11/18 | (2006.01) |
| B01J 21/04 | (2006.01) |
| B01J 21/16 | (2006.01) |
| B01J 37/00 | (2006.01) |

(52) U.S. Cl.
CPC ............... *B01J 29/84* (2013.01); *B01J 21/04* (2013.01); *B01J 21/16* (2013.01); *B01J 29/005* (2013.01); *B01J 29/83* (2013.01); *B01J 37/0045* (2013.01); *C10G 11/05* (2013.01); *C10G 11/18* (2013.01); *B01J 2229/42* (2013.01)

(58) Field of Classification Search
None
See application file for complete search history.

(56) References Cited

U.S. PATENT DOCUMENTS

| 3,758,403 A | 9/1973 | Rosinski |
| 3,801,704 A * | 4/1974 | Kobayashi ............... B01J 27/16 |
| | | 423/309 |
| 5,190,902 A | 3/1993 | Demmel et al. |
| 5,194,412 A | 3/1993 | Roberie et al. |
| 5,194,415 A | 3/1993 | Stricklen et al. |
| 5,456,821 A | 10/1995 | Absil et al. |
| 5,472,594 A | 12/1995 | Tsang et al. |
| 5,521,133 A | 5/1996 | Koermer et al. |
| 6,080,303 A | 6/2000 | Cao et al. |
| 6,211,104 B1 | 4/2001 | Shi et al. |
| 6,355,591 B1 * | 3/2002 | Kuvettu ................... B01J 27/16 |
| | | 502/64 |
| 6,566,293 B1 | 5/2003 | Vogt et al. |
| 6,916,757 B2 | 7/2005 | Ziebarth et al. |
| 7,375,048 B2 | 5/2008 | Smith et al. |
| 7,459,413 B2 | 12/2008 | Shen et al. |
| 7,727,924 B2 | 6/2010 | Liu et al. |
| 8,178,740 B2 | 5/2012 | Nicholas et al. |
| 9,067,196 B2 | 6/2015 | Ravichandran et al. |
| 2010/0144513 A1 | 6/2010 | Nicholas et al. |
| 2011/0207984 A1 | 8/2011 | De Almeida et al. |
| 2013/0023710 A1 * | 1/2013 | Ravichandran ........ C10G 11/18 |
| | | 585/639 |
| 2016/0074842 A1 * | 3/2016 | Sarkar .................... C10G 11/02 |
| | | 208/114 |

FOREIGN PATENT DOCUMENTS

| CN | 1291915 C | 12/2006 |
| CN | 1312255 C | 4/2007 |
| CN | 1957070 A | 5/2007 |
| CN | 1332757 C | 8/2007 |
| CN | 101454080 A | 6/2009 |
| CN | 102049290 A | 5/2011 |
| CN | 102049284 B | 10/2012 |
| CN | 103055944 A | 4/2013 |
| JP | 2014184361 | * 10/2014 |

(Continued)

OTHER PUBLICATIONS

International Preliminary Report on Patentability re Application No. PCT/US2016/043659 dated Jan. 23, 2018.

*Primary Examiner* — Colin W. Slifka
(74) *Attorney, Agent, or Firm* — Nathaniel C. Dunn; Troy S. Kleckley; Marcy M. Hoefling

(57) ABSTRACT

Provided is a process for manufacturing a Fluid Catalytic Cracking catalyst additive composition with a novel binder. The steps involve mixing an alumina source with water to make a slurry; adding to the alumina slurry an amount of P2O5 source; the slurry is then stirred and reacted under controlled temperature and time conditions to form an aluminum phosphate binder; adding to the aluminum phosphate binder a zeolite, an amount of silica binder and an amount of clay; and spray-drying the slurry to form catalyst additive particles. The catalyst additive composition comprises a about 35 wt % to about 65 wt % zeolite; about 0 wt % to about 10 wt % silica; about 15 wt % to about 50 wt % clay and an aluminum phosphate binder comprising about 2.5 wt % to 5 wt % amorphous or pseudo-boehmite alumina and about 7 wt % to 15 wt % phosphoric acid.

12 Claims, No Drawings

(56) References Cited

FOREIGN PATENT DOCUMENTS

| JP | 2014184361 A | 10/2014 |
| WO | 1994013754 | 6/1994 |
| WO | 1998041595 | 9/1998 |
| WO | 2005/110597 A1 | 11/2005 |

\* cited by examiner

FCC CATALYST ADDITIVE AND BINDER

TECHNICAL FIELD

This invention relates to a Fluid Catalytic Cracking (FCC) additive. More particularly, the present invention relates to a zeolite based FCC additive and a method for preparing the same with a novel binding system.

THE INVENTION

In FCC practice, there are several ways to increase light olefin selectivity. One such way is to increase the reaction temperature. This will increase the contribution of thermal cracking, which leads to increased formation of lighter products. For instance, in a Deep Catalytic Cracking process, higher temperatures and increased amounts of steam are used. Thermal cracking, however, may not be very selective and produces large amounts of products of relatively little value, such as hydrogen, methane, ethane, and ethylene The second method is to add an olefin-selective, zeolite-containing additive such as a ZSM-5-containing additive. Conventional additives usually contain phosphorus-activated ZSM-5, which selectively converts primary cracking products (e.g., gasoline olefins) to $C_3$ and $C_4$ olefins. Improvement of the activity or the selectivity with phosphorus is known to increase the effectiveness of ZSM-5. For instance, EP-A-511 013 describes the treatment of ZSM-5 with phosphorus to increase the propylene selectivity. Further, U.S. Pat. No. 5,472,594 describes a process for converting a hydrocarbon feed to a product containing improved yields of $C_4/C_5$ olefins with a catalyst composition containing zeolite Y and an additive comprising a phosphorus-containing medium pore zeolite such as ZSM-5. Also Mobil's WO 98/41595 describes a process for the catalytic cracking of a hydrocarbon feedstock to produce an enhanced yield of $C_3$ to $C_5$ olefins using a catalyst composition comprising a large pore molecular sieve such as zeolite Y and an additive comprising a phosphorus-containing ZSM-5 blended in with the base catalyst containing zeolite Y. The same is described in U.S. Pat. No. 5,456,821. WO 94/13754 describes the same process using a catalyst composition containing a large pore molecular sieve and an additive containing a specific ZSM-5 which optionally contains 1.5 to 5.5 wt % elemental phosphorus. Also U.S. Pat. No. 5,521,133 describes the preparation of a ZSM-5 additive by injecting a ZSM-5 and kaolin slurry with phosphoric acid prior to spray-drying.

Zeolite is one of the most widely used catalytic materials in hydrocarbon conversions. It is being widely used as catalyst and/or additive in catalytic crackers or incorporated in cracking catalysts. The use of cracking catalyst comprised of a large pore size crystalline zeolite (pore size greater than 7 angstrom units) in admixture with ZSM-5 type zeolite for improving the octane number has been reported in U.S. Pat. No. 3,758,403. When a conventional catalyst containing 10 percent REY is added with ZSM-5 molecular sieve in the range of 1.5 percent to 10 percent, the gasoline octane number and the yield of lower olefins are increased. However, it has been found that the increasing amplitude is reduced with increasing amount of ZSM-5 molecular sieve. Using an additive that contains ZSM-5 molecular sieve has the same effect.

These and still other embodiments, advantages and features of the present invention shall become further apparent from the following detailed description, including the appended claims.

FURTHER DETAILED DESCRIPTION OF THE INVENTION

Unless otherwise indicated, weight percent (_____ wt %) as used herein is the dry base weight percent of the specified form of the substance, based upon the total dry base weight of the product for which the specified substance or form of substance is a constituent or component. It should further be understood that, when describing steps or components or elements as being preferred in some manner herein, they are preferred as of the initial date of this disclosure, and that such preference(s) could of course vary depending upon a given circumstance or future development in the art.

One of the most preferred methods to convert heavy hydrocarbon feed stocks to lighter products, such as gasoline and distillate range fractions is fluid catalytic cracking (FCC). There is, however, an increasing need to enhance the yield of lower olefins, LPG, propylene and other light olefin yields ($C_2$-$C_4$ hydrocarbon) in the product slate from catalytic cracking processes.

The present invention relates to an additive specifically meant to be employed in the process for cracking, a hydrocarbon feed over a particular catalyst composition to produce conversion product hydrocarbon compounds of lower molecular weight than feed hydrocarbons, e.g., product comprising a high propylene fraction and increased LPG.

A typical FCC additive procedure is as follows. Alumina and/or silica binder is mixed with required amount of zeolite slurry, clay, and phosphoric acid. This mixture is sent to a spraydrier to make the final catalyst. The alumina and/or silica binder is added to the catalyst mixture for performance and good physical properties, mainly ABD and attrition resistance of the FCC additive. The alumina binder can be an amorphous or pseudo-boehmite alumina sol (particle size <1000 nm) either dispersed or dissolved with the use of monoproctic acids, like $HNO_3$, HCl, formic or any other aluminum source dissolved in monoproctic acid. The silica binder can be sources of silica in suitable dispersed form and include silica hydrosol, silica gel, silica sol and silicic acid.

The present invention, however, is based on a process with low amount of amorphous or pseudo-boehmite alumina binder (<5 wt %) and without the need to use a monoprotic acid for pretreating the alumina. The amorphous or pseudo-boehmite alumina binder is reacted with phosphoric acid, or other suitable phosphorous source, to make an in-situ aluminum phosphate at least equivalent physical properties and performance as FCC additive made by previously known methods at this low alumina binder level. It is believed that the in-situ aluminum phosphate of the present invention creates an alternative manufacturing route by eliminating the need for dispersing or dissolving the alumina with, for example, a monoprotic acid.

In accordance with the present invention there is provided a zeolite based hydrothermally resistant FCC catalyst additive which consists of a product obtained by the new method disclosed herein comprising: zeolite about 35 wt % to about 65 wt %; silica about 0 wt % to about 10 wt %; clay 15 wt % to 50 wt % and an aluminum phosphate binder comprising about 2.5 wt % to 5 wt % amorphous or pseudo-boehmite alumina and about 7 wt % to 15 wt % phosphoric acid.

In still another aspect of the present invention there is provided a process for preparation of a zeolite based FCC catalyst additive that selectively improves the yield of propylene. A process of the present invention is also aimed at providing a FCC additive catalyst that is capable of providing and sustaining a high propylene yield for an extended time period.

A typical embodiment of the present invention contains the following steps. A typical order of addition is as follows:
 (a) dose amorphous or pseudo-boehmite alumina and water (or other suitable aqueous solution) to tank to form an alumina slurry;
 (b) add the required amount of phosphorous containing compound to get the measured $P_2O_5$ level needed in the final catalyst; react alumina with $P_2O_5$ under controlled temperature and time conditions to produce a suitable aluminum phosphate binder;
 (c) dose aluminum phosphate binder to the balance of other ingredients;
 (d) send the slurry to a spray drier;
 (e) collect spray dried catalyst powder and this is the final additive;
 (f) optionally, the final product can be calcined, for example at a temperature of between about 250° C. and about 700° C.

The alumina slurry and phosphorous containing compound should be combined and reacted, prior to the addition of any other components/ingredients. For example, and as shown below in the examples, when the alumina slurry is mixed with zeolite, clay or clay/silica prior to the introduction of phosphorous containing compound, the resulting additive exhibits higher comparative attrition than if the alumina and phosphorous containing compound are mixed prior to the addition of the other components.

The alumina mentioned in step (a) is a typical amorphous or pseudo-boehmite used in FCC catalyst applications. The term "boehmite" is used in the industry to describe alumina hydrates which exhibit X-ray diffraction (XRD) patterns close to that of aluminum oxide-hydroxide [AlO(OH)]. Further, the term boehmite is generally used to describe a wide range of alumina hydrates which contain different amounts of water of hydration, have different surface areas, pore volumes, specific densities, and exhibit different thermal characteristics upon thermal treatment. Yet their XRD patterns, although they exhibit the characteristic boehmite [AlO(OH)] peaks, usually vary in their widths and can also shift in their location. The sharpness of the XRD peaks and their location has been used to indicate the degree of crystallinity, crystal size, and amount of imperfections.

Broadly, there are two categories of boehmite aluminas: quasi-crystalline boehmites (QCBs) and micro-crystalline boehmites (MCBs). In the state of the art, quasi-crystalline boehmites are also referred to as pseudo-boehmites and gelatinous boehmites. Usually, these QCBs have higher surface areas, larger pores and pore volumes, and lower specific densities than MCBs. They disperse easily in water or acids, have smaller crystal sizes than MCBs, and contain a larger number of water molecules of hydration. The extent of hydration of QCB can have a wide range of values, for example from about 1.4 up to about 2 moles of water per mole of Al, intercalated usually orderly or otherwise between the octahedral layers. DTG (differential thermal gravimetry) indicates that the major amount of water is released from QCBs at a much lower temperature than from MCBs. Typical and acceptable boehmites are commercially available as Catapal and Pural, for example.

The amount of alumina added in step (a) is typically in the range of about 2.5 wt % to about 5.0 wt % of the final dried additive, calculated as $Al_2O_3$, and preferably between about 3 wt % and about 4 wt %. Typical solids content of the diluted alumina slurry range about 5 wt % to about 30 wt % $Al_2O_3$, and more preferably above about 9 wt %.

During the above step (b), any suitable phosphorus-containing compound, i.e. any phosphorus-containing compound having a covalent or ionic constituent capable of reacting with hydrogen ion, may be employed, for example phosphoric acid and its salts such as ammonium dihydrogen phosphate and diammonium hydrogen phosphate, ammonium hypophosphate, ammonium orthophosphate, ammonium dihydrogen orthophosphate, ammonium hydrogen orthophosphate, triammonium phosphate, phosphines, and phosphites. Suitable phosphorus-containing compounds include derivatives of groups represented. by $PX_3$, $RPX_2$, $R_2PX$, R1P, $R_3P=O$, $RPO_2$, $RPO(OX)_2$, $PO(OX)_3$, $R_2P(O)$ OX, $RP(OX)_2$, $ROP(OX)_2$, and $(RO)_2POP(OR)_2$, wherein R is an alkyl or phenyl radical and X is hydrogen, R or halide. These compounds include primary, $RPH_2$, secondary, $R_2PH$, and tertiary, $R_3P$, phosphines such as butyl phosphine; tertiary phosphine oxides, $R_3PO$, such as tributyl phosphine; primary, $RP(O)(OX)_2$, and secondary, $R_2P(O)OX$, phosphonic acids such as benzene phosphonic acid; esters of the phosphonic acids such as diethyl phosphonate, $(RO)_2P(O)H$, dialkyl phosphinates, $(RO)P(O)R_2$; phosphinous acids, $R_2PDX$, such as diethylphosphinous acid, primary, $(RO)P (OX)_2$, secondary, $(RO)_2PDX$, and tertiary, $(RO)_3P$, phosphites; and esters thereof such as monopropyl ester, alkyldialkyl phosphinites, $(RO)P_2$, and dialkyl phosphonite, $(RO)_2PR$ esters. Examples of phosphite esters include trimethyl phosphite, triethyl phosphite, diisopropyl phosphite, butyl phosphite; and pyrophosphites such as tetrapyrophosphate. The alkyl groups in the mentioned compounds contain 1 to 4 carbon atoms. Other suitable phosphorus-containing compounds include phosphorus halides such as phosphorus trichloride, bromide, and iodide, alkyl phosphorodichloridites, $(RO)PCl_2$, dialkyl phosphorochloridites, $(RO)_2PCl$, alkyl phosphonochloridates, $(RO)(R)P(O)Cl$, and dialkyl phosphinochloridates, $R_2P(O)Cl$.

The amount of phosphorous added during step (b) is preferably about 8 wt % to about 12 wt % $P_2O_5$ but within the range of about 7 wt % to about 15 wt % $P_2O_5$ on catalyst, by dry weight basis. During step (b) the molar ratio of the phosphorous to the amorphous or pseudo-boehmite alumina binder plays a significant role in the performance of the additive. It is found the optimal performance is obtained from the P/Al molar ratios from 1:1 to 3:1, and more preferably about 1.5:1 to about 2.5:1 ratio. The amount of phosphorous can act to react with the alumina as well as to stabilize the zeolite.

Another aspect of the invention is that it is preferred that the mixture of aluminum phosphate to be maintained below a set temperature and time to yield an additive after spray drying that will have acceptable physical properties. Therefore, at step (b) the slurry is stirred and reacted for a time of at least five seconds but no more than 24 hours, and preferably, no more than 8 hours. At step (b) the slurry is stirred and reacted above 5° C., but usually not higher than 60° C. preferably between 20° C. and 55° C.

The zeolite added during step (c) is a typical olefin-selective zeolites, which is defined as a zeolite having a silica/alumina ratio above 10, preferably above 15, and up to 12 rings. Typically, the amount of zeolite added to the mixture is about 35 wt % to about 65 wt %.

Examples of suitable olefin-selective zeolites are MFI-type zeolites, MEL-type zeolites such as ZSM-11, MTW-type zeolites such as ZSM-12, MWW-type zeolites such as MCM-22, MCM-36, MCM-49, MCM-56, and BEA-type zeolites such as zeolite beta. MFI-type zeolites are preferred. MFI-type zeolites are as defined in the ATLAS OF ZEOLITE STRUCTURE TYPES, W. M. Meier and D. H. Olson, 3rd revised edition (1992), Butterworth-Heinemann, and include ZSM-5, ST-5, ZSM-8, ZSM-11, silicalite, LZ-105, LZ-222, LZ-223, LZ-241, LZ-269, L2-242, AMS-1B, AZ-1, BOR-C, Boralite, Encilite, FZ-1, NU-4, NU-5, T5-1, TSZ, TSZ-III, TZ01, TZ, USC-4, USI-108, ZBH, ZB-11, ZBM-30, ZKQ-1B, ZMQ-TB. It should be noted that the ZRP zeolite as described in NL 9301333 is not considered a MFI-type zeolite within the context of this description.

Further during step (c), it is typical to add a silica binder in the range of about 0 wt % to about 10 wt %. More preferably around 3 wt % to about 8 wt % silica binder is added to the slurry for optimal binding and performance. Sources of silica in a suitably dispersed form include silica hydrosol, silica gel, silica sol, and silicic acid. The preferred source of silica is an aqueous colloidal dispersion of silica particles. Silica sols suitable for use in the present invention are any of those derived from an ion-exchange process which have a substantially uniform particle size within the range of about 10 to about 400 Angstroms.

The balance of the additive is clays, such as kaolin, bentonite, or meta-kaolin, or other fillers.

The present invention is also directed to the previously described catalyst composition obtainable by the process of the invention. Compositions according to this invention can be added to an FCC unit with the hydrocarbon feed, simultaneously with one or more catalysts, or after the hydrocarbon feed and one or more catalysts have been added. In one embodiment, composition according to this invention is combined with one or more FCC catalysts. Said catalyst composition can suitably be used in the catalytic cracking of hydrocarbon feedstocks and has high efficiency in the production of light olefins while maintaining the bottoms conversion. The catalyst composition may also be used in the so-called DCC process even when using lower temperatures than usual in DCC processes.

EXAMPLES

The invention is illustrated in the following non-limiting examples, which are provided for the purpose of representation, and are not to be construed as limiting the scope of the invention.

Prior to any lab testing the catalyst must be deactivated to simulate catalyst in a refinery unit, this is typically done with steam. These samples were deactivated with 100% steam at 788° C. or 800° C. for 20 hours. It should be noted that while this example is done as a Fluidized Bed Simulation, the propylene yield at a given conversion is essentially the same as that which would be given in commercial practice because lab deactivated catalyst mimics catalyst deactivated in a FCC unit. The Fluid microactivity test, or Fluidized-bed Simulation Test (FST) is a test known and generally accepted in the art for ascertaining the FCC cracking activity of a catalyst. The test is conducted with a series of catalyst-to-feed ratios (CTO) which are obtained by varying the mass of catalyst present in the reactor while using the same feed rate for all runs. The testing apparatus simulates the cracking of a known amount of a hydrocarbon feedstock of known amount and compositional characteristics. This small scale testing unit is a once through unit and operated approximately as in ASTM 5154-10. The reactor is in a hot furnace and the catalyst is added directly to the reactor followed by the feed injection, as outlined below. Then, 4.5 to 9 grams of catalyst were loaded into the FST unit. The reaction temperature was fixed at 537° C. 1.5 grams of a hydrocarbon feed are injected at a rate of 1.5 grams per minute. The gas and liquid products were collected and their component proportions were analyzed by GC. The weight percent conversion is the weight percent of the feed which is converted into coke, gas and gasoline:

100×[(weight of feed)−(weight of light cycle oil produced)−(weight of bottoms/residue formed, excluding coke on catalyst]/[weight of feed]

For testing additives one blends it with a FCC catalyst prior to performance testing at concentrations to simulate commercial use. For the following examples, additives were blended at 5% blends.

The weight of the coke on the catalyst is measured by removing the catalyst from the reactor after the reaction and subjecting it to analysis by a LECO™ carbon analyzer.

The examples below utilize a typical VGO crude oil. Other feeds can be used and the feed properties do impact the absolute yields of LPG and in particular propylene.

Example 1

Five additive samples were made using the methodology described herein. A sixth base case made by way of prior methods was also used. The five additives were then performance tested to determine propylene yields (reported values are at CTO=4) after blending it in to an Ecat at 5% level.

|  | Base Case | Example A | Example B | Example C | Example D | Example E |
|---|---|---|---|---|---|---|
| ZSM5 | 40 | 40 | 50 | 50 | 50 | 50 |
| pseudo-boeh |  | 3.8 | 3.8 | 3.8 | 3.8 | 3.8 |
| P$_2$O$_5$ |  | 9.5 | 10.5 | 11 | 11.5 | 12 |
| ABD | 0.70 | 0.71 | 0.72 | 0.72 | 0.73 | 0.73 |
| Attrition | 0.4 | 0.25 | 0.49 | 0.39 | 0.32 | 0.3 |
| Propylene, wt % CTO = 4 | 8.96 | 9.80 | 9.88 | 8.75 | 8.23 | 7.52 |

Example 2

Another aspect of the additive was tested by varying the solids of the alumina prior to the addition of the H$_3$PO$_4$. Four samples of the additive were made in accordance with the invention described herein. The same weight percent of ingredients were used while the alumina solid percentage was varied. The resulting tests showed that to maintain preferred physical properties of the additive, the alumina slurry should preferably be maintained above 9 wt % solids during the synthesis of the Al—P material as shown in the table below.

|  | Alumina Solid: 8% | Alumina Solid: 9% | Alumina Solid: 10% | Alumina Solid: 12% |
| --- | --- | --- | --- | --- |
| ABD | 0.69 | 0.69 | 0.69 | 0.7 |
| Attrition | 1.6 | 0.65 | 0.6 | 0.65 |

Example 3

Another aspect of the invention is that the reaction mixture of aluminum and phosphate is preferably maintained below a set temperature. When done so, the process yields an additive after spray drying that will have acceptable physical properties. Two examples were made in accordance with the invention described herein. The same weight percent of ingredients were used while the temperature of the aluminum and phosphorous mixture was varied. The samples were in both examples allowed to react for 5 minutes prior to mixing with all other ingredients. The table below shows that when the Al—P mixture reached a temperature of 64° C. the attrition increased from the sample which had a temperature of 55° C. for the Al—P mixture.

|  | Example 3-1 | Example 3-2 |
| --- | --- | --- |
| Temp Al-P (° C.) | 55.0 | 64.0 |
| ABD | 0.7 | 0.7 |
| Attrition | 0.4 | 1.8 |

Example 4

Another aspect of the invention is that order of addition affects the properties of the final catalyst. Four samples of the additive were made in accordance with the invention described herein. The same weight percent of ingredients were used while the order of addition was varied for each sample. The samples were allowed to react for 5 minutes prior to mixing with all other ingredients. The first sample was prepared by reacting alumina in the presence of phosphoric acid. The second sample was prepared by reacting the alumina with the phosphoric acid in the presence of zeolite. The third sample was prepared by reacting alumina with phosphoric acid in the presence of clay. The fourth sample was prepared by reacting alumina with phosphoric acid in the presence of clay and silica. The physical properties are disclosed in the below table. The results show poor calcined attrition values for each sample wherein the alumina is reacted with the phosphoric acid in the presence of another ingredient, not including water or other aqueous solution.

|  | $H_3PO_4$ + Pseudo-boeh | $H_3PO_4$ + Pseudo-boeh + Zeolite | $H_3PO_4$ + Pseudo-boeh + clay | $H_3PO_4$ + Pseudo-boeh + clay + Si-sol |
| --- | --- | --- | --- | --- |
| ABD | 0.73 | 0.70 | 0.73 | 0.73 |
| Attrition | 0.4 | 10.1 | 1.0 | 3.4 |

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise. This invention is susceptible to considerable variation in its practice. Therefore the foregoing description is not intended to limit, and should not be construed as limiting, the invention to the particular exemplifications presented hereinabove.

The invention claimed is:

1. A process for the preparation of a catalyst additive comprising the following steps:
   a. mixing an alumina source with water to make a slurry;
   b. adding to the slurry of step (a) an amount of $P_2O_5$ source;
   c. the slurry of step (b) is then stirred and reacted at a temperature above 5° C. but not higher than 60° C. and under time conditions to form an aluminum phosphate binder;
   d. adding to the aluminum phosphate binder a zeolite, an amount of silica binder and an amount of clay; and
   e. spray-drying the slurry of step (d) to form catalyst additive particles.

2. The process of claim 1 further comprising the step of calcining the catalyst additive particles after step (e) at a temperature of between about 350° C. and about 700° C.

3. The process of claim 1 wherein the alumina source is amorphous or pseudoboehmite alumina added in an amount of less than about 5 wt %.

4. The process of claim 3 wherein the amorphous or pseudoboehmite alumina is added in amount of greater than about 2.5 wt % and less than about 5 wt %.

5. The process of claim 1 wherein the solids content of the slurry of step (a) to be between about 5 wt % and about 30 wt % $Al_2O_3$.

6. The process of claim 1 wherein the solids content of the slurry of step (a) to be between about 9 wt % and about 30 wt % $Al_2O_3$.

7. The process of claim 1 wherein the source of the amount of $P_2O_5$ is $H_3PO_4$ and the $P_2O_5$ is added in an amount between about 7 wt % and 15 wt %, by dry weight basis.

8. The process of claim 1 wherein the source of the amount of $P_2O_5$ is $H_3PO_4$ and the $P_2O_5$ is added in an amount between about 8 wt % and 12 wt %, by dry weight basis.

9. The process of claim 1 wherein the P/Al molar ratio at step (b) is between 1 and 3.

10. The process of claim 1 wherein the P/Al molar ratio at step (b) is between 1.5 and 2.5.

11. The process of claim 1 wherein the silica binder is added in the range of greater than about 0 wt % to about 10 wt %.

12. The process of claim 1 wherein the silica binder is added in the range of about 3 wt % to about 8 wt %.

* * * * *